United States Patent [19]
Shuford

[11] 3,844,405
[45] Oct. 29, 1974

[54] QUICK ADJUSTING GUIDE RAIL FOR CONVEYOR

[75] Inventor: Lloyd N. Shuford, Lynchburg, Va.

[73] Assignee: Simplimatic Engineering Company, Lynchburg, Va.

[22] Filed: Sept. 1, 1972

[21] Appl. No.: 285,671

[52] U.S. Cl. .............................. 198/204
[51] Int. Cl. ............................. B65g 15/60
[58] Field of Search ..................... 198/204

[56] References Cited
UNITED STATES PATENTS

| | | | |
|---|---|---|---|
| 1,877,334 | 9/1932 | Lathrop et al. | 198/204 |
| 2,156,020 | 4/1939 | Lathrop | 198/204 |
| 2,706,034 | 4/1955 | Russell et al. | 198/204 |

*Primary Examiner*—Richard A. Schacher
*Assistant Examiner*—Joseph E. Valenza

[57] ABSTRACT

An improved laterally adjustable guide rail mounting structure for a conveyor apparatus is described which eliminates the laterally protruding members characteristic of prior art structures and substantially increases the ease and quickness of lateral adjustment thereof. That structure comprises a pair of upstanding bracket members having inwardly extending tongues adapted to be received through openings in opposite side walls of the conveyor support. The conveyor support side walls are operatively structurally connected by means of a hollow tubular member in registration with the side wall openings, that tubular member receiving the inwardly extending tongues of the guide rail supporting brackets. Means in the form of an expandable wedge assembly are provided for adjustably forcing the bracket tongues into frictional locking engagement with the tubular member in any desired lateral position of the guide rail mounting brackets.

14 Claims, 4 Drawing Figures

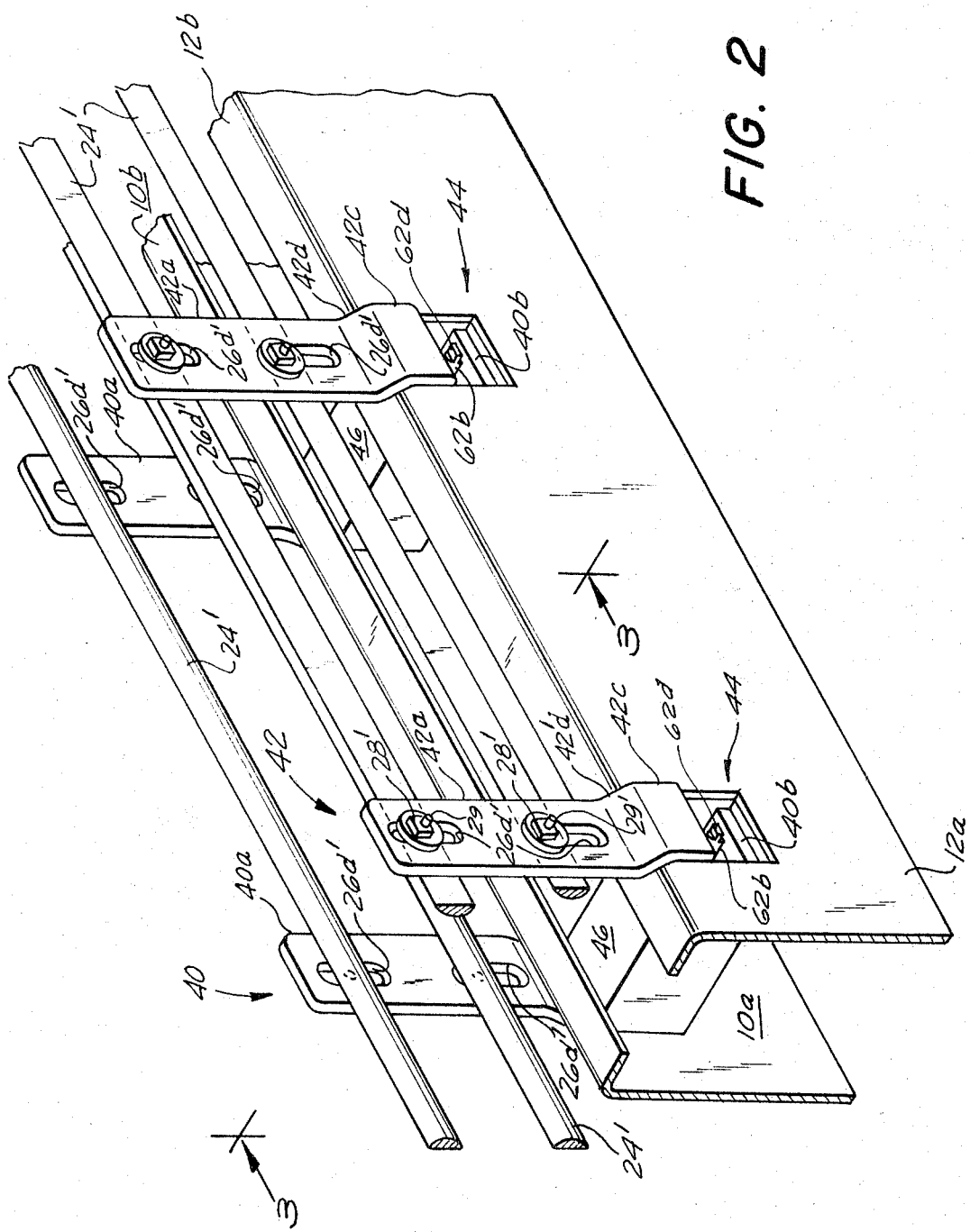

QUICK ADJUSTING GUIDE RAIL FOR CONVEYOR

This invention relates to apparatus for adjustably securing brackets to a support and more particularly to an improved construction for adjustably mounting a pair of upstanding guide rail supporting brackets.

The age of automation has spawned a variety of conveying and product handling apparatus in virtually every modern production industry. Production line technique requires articles of all types to be moved in a rapid, orderly and efficient manner from one operating station to the next. The conveyors or other apparatus used to transport articles or material are generally provided with lateral guide structure to maintain the transported articles properly supported on the conveyor surface. Typically this structure takes the form of one or more guide rails mounted laterally outwardly of the conveyer surface. Commonly, such guide rails must be mounted for adjustment both in terms of lateral spacing and height. This is particularly true in the product handling field where a single conveyor must be capable of accommodating products of various sizes and shapes.

Accordingly, the structure for mounting such guide rails should provide for such adjustment in an easy, rapid and reliable manner. In addition, such mounting structure must be designed with sufficient strength to withstand the lateral forces encountered in operation.

The guide rail mounting structure almost universally adopted by the conveyor industry several years ago and still used today for virtually all types of conveyor apparatus consists of two pairs of simple angle brackets. The first pair, or lower brackets, are disposed in opposing relationship with one leg fastened directly to the opposite side walls of the conveyor frame. Their other legs extend laterally outwardly of the conveyor in opposite directions and provide a horizontal supporting surface for the second pair or upper brackets. The laterally extending legs of the upper brackets are placed flush on the horizontal support legs of the lower brackets and are fastened thereto by suitable bolts through registering slots in the contiguous legs. One or both of those slots is elongated in the lateral direction (i.e., perpendicular to the conveyor axis) so as to provide a measure of lateral adjustability. Mounting brackets of this type are typically fastened to the conveyor frame at a spacing of from 12 to 24 inches along its length, the guide rails themselves being secured to the upstanding legs of the upper brackets by suitable fastening means extending through slots in those legs. Those slots are likewise elongated in the vertical direction to provide for height adjustment of the rails.

The conventional guide rail support structure as described above possesses several well known disadvantages, the most notable of which is the significant safety hazard posed by the laterally protruding angle brackets. Indeed, the more lateral adjustability required, the further those brackets must protrude outboard of the conveyor frame. The resulting safety hazard has in recent years come sharply into focus with the increased awareness of the need for industrial safety both by industry and government.

An additional drawback of conventional structure of this type is the time and difficulty involved in installing the supporting brackets and in making subsequent adjustments. For example, the bracket structure at each location along the conveyor typically includes no less than six fastening points — two each securing the lower brackets to the side walls of the conveyor frame and one each to secure the upper brackets to the lower brackets. Moreover, lateral adjustment of the upper brackets requires the loosening and tightening of the fastening bolts on both sides of the conveyor, an operation which requires substantial time and/or personnel. Indeed, the above adjustment procedure in turn results in another severe drawback, that of increased floor space — adequate space must be provided on both sides of the conveyor to accomodate the protruding brackets and to provide access room for manual adjustment of same. As a result, the conveyor must be substantially spaced from walls and other equipment along its entire length.

In addition to safety, quick adjustability and compactness, guide rail mounting structure ideally should exhibit good strength and here again conventional bracket structure leaves much to be desired. Thus, as a result of the large moment arm on the laterally protruding legs, particularly where large adjustments must be accommodated, those legs tend to bend downwardly after long periods of use (or indeed merely as a result of inadvertant contact with other equipment), whereby the upstanding guide rail support legs tend to flare outwardly.

Finally, conventional structure of the type described simply does not possess the simple and clean appearance characteristic of good conveyor design. In short, in today's streamlined and efficient conveyor apparatus the conventional guide rail mounting bracket structure, literally and figuratively sticks out like a sore thumb.

Notwithstanding a widespread awareness of all of the above, the conveyor industry has never designed a viable alternative to the protruding bracket structure.

It is a primary object of the present invention to provide a new adjustable bracket mounting structure designed to eliminate all of the aforementioned drawbacks of conventional structure at a reduction in material cost.

More particularly, it is an object of the present invention to design a guide rail mounting structure of the type described having a simple and clean appearance and which eliminates the safety hazard of protruding parts.

It is yet another object of the present invention to provide a pair of adjustable mounting brackets designed to be adjustably mounted on a support structure by means of a single adjustable locking member.

It is still another object of the present invention to provide a guide rail support structure which is designed with increased strength and reliability yet requires fewer parts and less material at a reduction in cost.

It is still a further object of the present invention to design an adjustable guide rail mounting structure for a conveyor which exhibits an increased lateral adjustment capacity without the need for protruding parts.

Another object of the present invention resides in the elimination of the need for substantial clearance space on both sides of a conveyor thereby to improve the economy of production line floor space.

Finally, it is an object of the present invention to provide a guide rail mounting structure for a conveyor which in addition to having a clean, simple and safe design also provides the conveyor frame itself with increased strength and structural integrity.

These and other objects are accomplished in accordance with the present invention by providing a bracket support structure comprising a single pair of brackets each having an upstanding support portion and an inwardly extending tongue adapted to be frictionally locked to the conveyor support frame inwardly thereof. As herein disclosed, the conveyor support is provided with an aperature extending laterally therethrough from one side wall to the other. That aperture is adapted to receive the inwardly extending bracket tongues at either side of the frame. Adjustable locking means is provided for locking those tongues to the conveyor frame in any desired lateral position thereby to provide for quick lateral adjustability.

In a preferred form of the invention, the conveyor framework is formed with a hollow tubular member operatively connected between the spaced conveyor sidewalls. The tongue receiving apertures are formed on opposite side walls in registration with that tubular member, thereby forming an open ended hollow tube into which the bracket tongues are inserted from opposite sides of the conveyor frame.

In the embodiment herein described, the tongues are inserted within the hollow tube in overlapping relationship and forced in opposite directions into engagement with the upper and lower walls, respectively, of the tubular member by means of the adjustable locking mechanism. That mechanism preferably comprises an expandable wedge arrangement including a pair of wedge blocks fitted together at their oppositely inclined surfaces. Means are provided for pulling those blocks together whereby the upper block rides upwardly on the lower block, thereby to lock the bracket tongues against the opposite tube walls. As here shown the blocks are thus movable by means of an adjusting shaft threaded at one end extending through one block and threadedly engaging the other. A face plate or other stop member is mounted on the adjusting shaft and engages the unthreaded wedge block to move same toward the threaded block as the adjusting shaft is screwed inwardly.

The other end of the adjusting shaft is accessible at the aperture in one side wall of the conveyor and may be provided with any suitable means for manual or tool engagement thereof for locking.

The resulting assembly combines the desirable features of simplicity and safety with an easy and rapid assembly and adjustability heretofore lacking in conventional structure. Moreover, this is accomplished with a reduction in the number of parts required and a corresponding reduction in cost.

To the accomplishment of the above and to such other objects as may hereinafter appear, the present invention relates to an adjustable support bracket structure as defined in the appended claims and as described herein with reference to the accompanying drawing in which:

FIG. 2 is a perspective view of a segment of a conveyor support constructed in accordance with the present invention and showing my novel guide rail mounting assembly;

Figure 1:
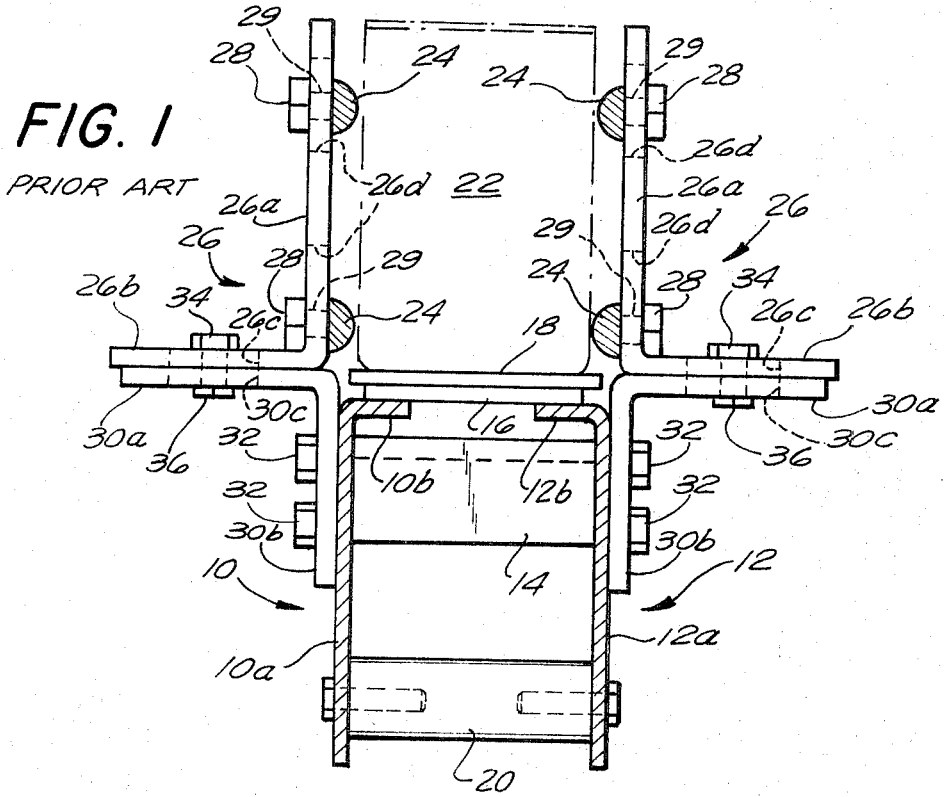
FIG. 1 is a cross-sectional view of a typical conveyor support showing a prior art guide rail mounting structure.

The various objects and advantages of the present invention will best be appreciated by a consideration of the prior art guide rail mounting structure which is today prevalent in the conveyor industry and has been there used for many years. As illustrated in FIG. 1 a typical conveyor support comprises a pair of inverted L shaped side frames 10 and 12 each including a vertical side wall 10a and 12a, respectively, and a horizontal lip 10b and 12b, respectively. Those side frames are arranged in spaced parallel arrangement with the lips 10b and 12b extending inwardly toward each other to form a horizontal support for the movable conveyor belt or chain. The side frames 10 and 12 are typically structurally connected at spaced locations along their lengths by suitable structural elements such as angle bars 14. A wear strip 16, typically of low friction material, is fastened atop the lips 10b and 12b and provides the supporting surface over which the conveyor belt or chain 18 slides in a direction into or out of the plane of the drawing. The conveyor chain 18 is driven by a suitable motor or the like (not shown) and is guided under the lips 10b and 12b in its lower flight by suitable guide rollers such as 20.

Conveyors of the type shown in FIG. 1 are designed to handle a variety of different types and quantities of articles of various shapes and sizes. The particular structure illustrated in FIG. 1, is of the type designed to convey a single line of containers or the like such as the cans 22 illustrated in broken lines in FIG. 1.

One or more longitudinally extending guide rails are typically supported at either side of the conveyor above the level of chain 18. As here specifically illustrated two such guide rails 24 are positioned in vertically spaced relationship at opposite sides of can 22, those rails being designed to guide and maintain the can 22 or other conveyed article properly positioned on the conveyor surface 18. Those rails are typically formed from half round bar stock and are mounted at spaced locations along their lengths on the upstanding legs 26a of a pair of upper angle brackets 26 by suitable fastening means such as nuts 28 engaging threaded members 29 projecting from the guide rails. Those brackets are in turn supported by their outwardly protruding legs 26b on the outwardly protruding legs 30a of a lower pair of similar angle brackets 30, the other legs 30b of which extend downwardly along the side walls 10a and 12a of the conveyor support and are secured to those side walls by suitable fastening means such as bolts 32.

The contiguous protruding legs 26b and 30a of upper and lower brackets 26 and 30 are both provided with slots designated 26c and 30c, respectively, those slots being elongated in a direction lateral to the conveyor axis. Those elongated slots provide for fastening of the upper brackets 26 to the lower brackets 30 at laterally adjustable positions by suitable fastening means such as bolts 34 extending through those slots and adapted to lockingly threadedly engage nuts 36. In addition, the guide rails 24 are adjustable in height, within limits, by virtue of vertical slots 26d in the upstanding legs 26a through which the threaded members 29 extend.

It will be appreciated that the upper angle brackets 26 may be moved laterally inwardly or outwardly from the position shown in FIG. 1 to accommodate articles of various sizes or shapes. However, the lateral adjustment requires the loosening of bolts 34 and nuts 36 on both sides of the conveyor sufficiently to accommodate a lateral sliding movement of the upper brackets 26 and a tightening of such nuts and bolts after the desired lateral movement has been effected. Moreover, original assembly of the guide rails in operative position on the conveyor support requires the additional locating and fastening of the bolts 32 to secure the lower brackets 30 to the side frames 10 and 12. The resulting time and personnel required for both assembly and adjustment is a source of significant expense, particularly in connection with lengthy conveyor systems and/or where the conveyor must frequently be adapted to handle articles of various sizes.

Moreover, the structure of FIG. 1 is admittedly unsightly and poses a significant safety hazard as a result of the sharp laterally protruding legs 26b and 30a of the angle bars 26 and 30, and that hazard increases with increasing lateral adjustability. Finally, the protruding bracket legs of the prior art structure of FIG. 1 effectively increase the width of the conveyor and are readily subject to deformation such as bending.

Figure 3:
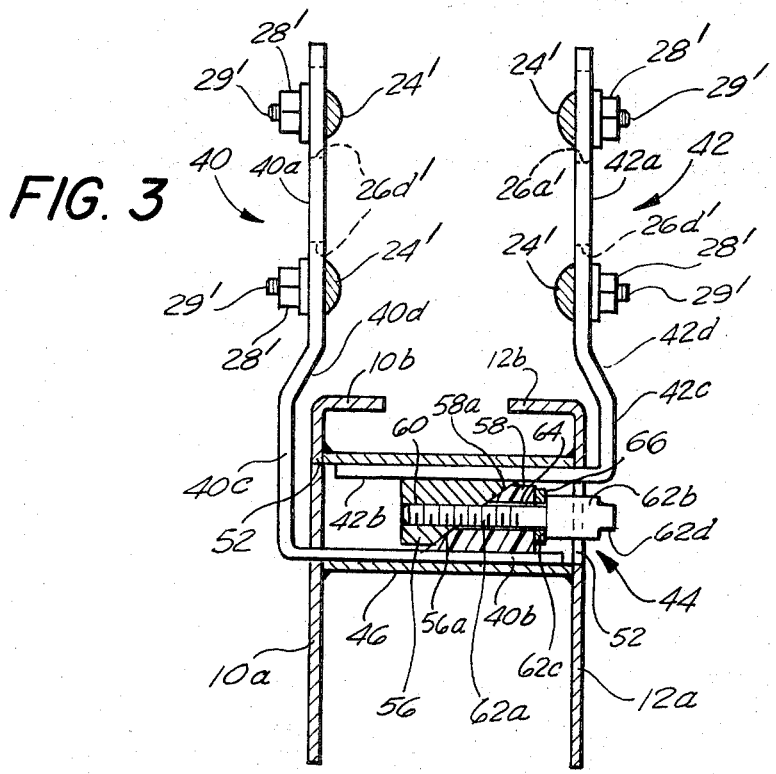
FIG. 3 is a cross-sectional view taken along the line 3—3 of FIG. 2.
Figure 4:
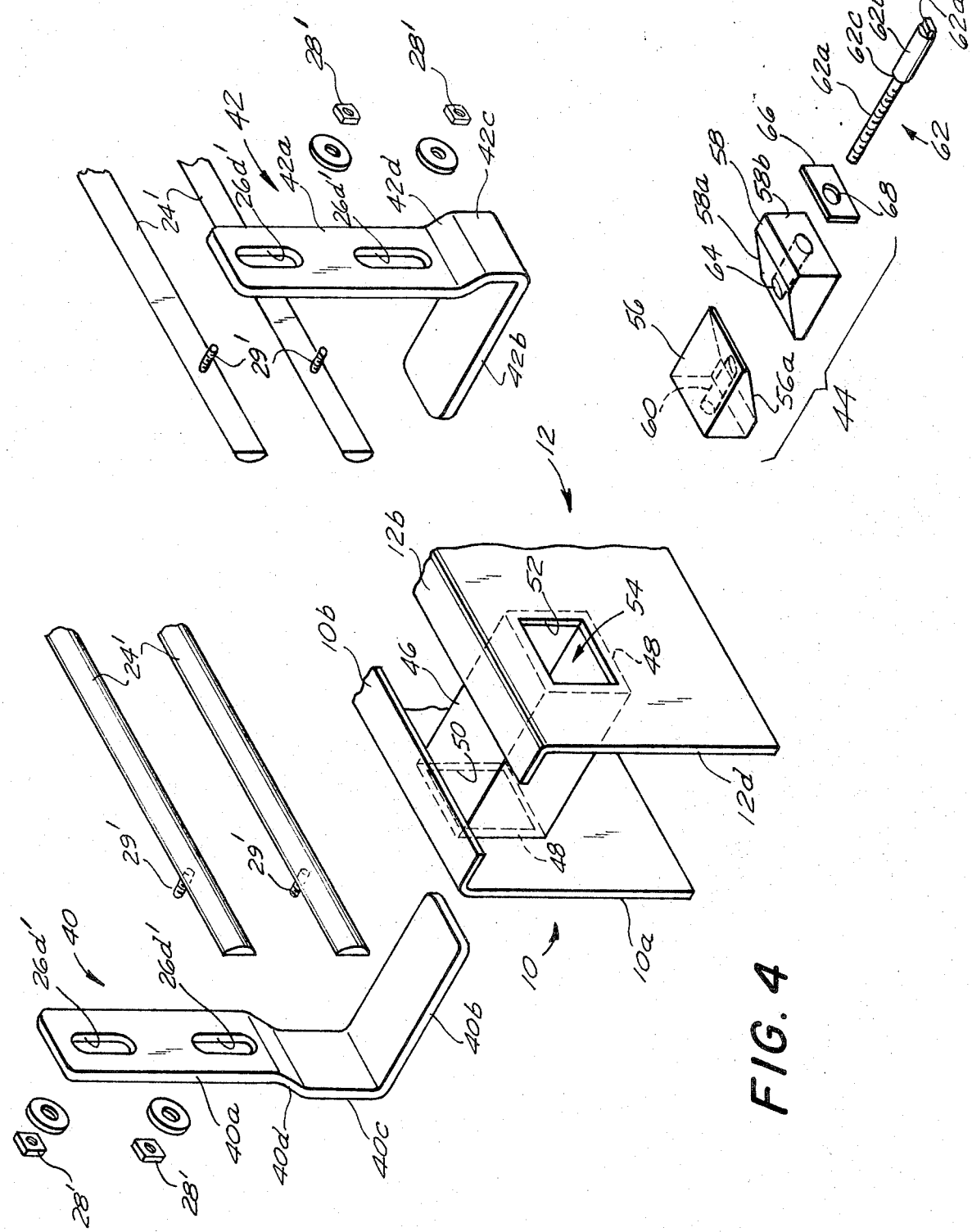
FIG. 4 is an exploded perspective view of the guide rail mounting assembly of FIG. 2 showing the details of the adjustable locking mechanism.

The bracket assembly of the present invention is provided with an ingenious yet extremely simple design which effectively solves all of the aforementioned problems. As illustrated in FIGS. 2-4, that assembly comprises only two brackets 40 and 42 designed to be adjustably secured to the conveyor support by a single adjustable locking mechanism 44. As best illustrated in the exploded perspective view of FIG. 4 brackets 40 and 42 both are generally L shaped and comprise upstanding guide rail support legs 40a and 42a, respectively, horizontally extending tongues 40b and 42b and vertically extending connecting portions 40c and 42c, respectively, connecting the two. Connecting portions 40c and 42c are formed with bends 40d and 42d, respectively, at their connections with the upstanding legs 40a and 42a, those bends serving a purpose which will hereinafter appear. It will be apparent from the drawings that brackets 40 and 42 are not identical, the connecting portion 40c on bracket 40 being longer than the corresponding portion 42c on bracket 42.

Referring to FIG. 4, it will be seen that the conveyor side frames 10' and 12' (for convenience parts corresponding to those in FIG. 1 will be designated with corresponding reference numerals with the addition of a prime), are operatively connected by a hollow tubular member 46 which, like the angle bar 14 in FIG. 1, serves as a structural connection and, like angle bar 14, is typically welded to the side frames at 48. As illustrated in FIG. 2, a plurality of such tubular members 46 are welded to the side frames 10 and 12 at spaced locations along their length.

Those tubular members, however, not only serve as structural connections for the conveyor support but also provide inboard receptacles for the tongues 40b and 42b of brackets 40 and 42. To this end the side walls 10a and 12a of the conveyor support are formed with square apertures 50 and 52 registering with the open ends of tubular member 46, thereby to define a laterally extending open ended passage 54 through the conveyor support below the lips 10b and 12b. That passage is designed with a width slightly larger than the width of tongues 40b and 42b.

As best shown in FIG. 2 those tongues are inserted into the passage 54 from opposite ends thereof in overlapping relationship, the tongue 40b of the bracket 40 with the longer connecting portion 40c underlying the tongue 42b of the opposite bracket 42. The adjustable locking assembly 44 is inserted within the passageway 54 through aperture 52 at the open end thereof and upon adjustment serves to simultaneously force the tongues 40b and 42b gainst the lower and upper walls of the tubular member 46 thereby to frictionally lock the brackets 40 and 42 to the conveyor support.

Locking assembly 44 may be any convenient expandable mechanism and is here shown as an expandable wedge assembly including a pair of wedge blocks 56 and 58 having inclined surfaces 56a and 58a, respectively, designed for interfitting sliding engagement. Wedge block 56 is provided with an internally threaded bore 60 adapted to threadedly receive the externally threaded end 62a of an adjusting shaft 62. The other end 62b of shaft 62 defines a shoulder 62c. Wedge block 58 is provided with an unthreaded aperture 64 registering generally with the threaded aperture 60 in block 56 and of a size accommodating threaded shaft portion 62a with substantial clearance. As illustrated in FIGS. 3 and 4, the threaded end 62a of adjusting shaft 62 extends through aperture 64 in block 58 and is threadedly received in bore 60 of block 56.

A rectangular face plate or washer 66 apertured at 68 is adapted to fit onto shaft portion 62a and as the shaft 62 is screwed into bore 60 that face plate is sandwiched between shoulder 62c and the side wall 58b of block 58. As the shaft 62 is turned further the inclined surfaces 56a and 58a of wedge blocks 56 and 58 are forced into sliding engagement, block 56 riding upwardly to the right on the inclined surface 58a of block 58 as viewed in FIG. 3 into engagement with tongue 42b. As a result tongue 42b is forced into frictional locking engagement with the upper wall of tubular member 46 by the upper surface of block 56 while tongue 40b is forced into frictional locking engagement with the lower wall of tubular member 46 by the lower surface of block 58. At least one of the wedge blocks, here block 58, should be formed of a rustproof, low friction material to prevent sticking or freezing of the blocks when maintained in the locked condition for long periods of time.

The unthreaded end of the adjusting shaft 62 is provided with a suitable gripping means adapted to be gripped for turning thereof for locking and unlocking the wedge assembly. As here shown in the drawings that means comprises a single flattened or nut-like end 62d adapted for engagement by a conventional wrench. However, a handle or the like for manual gripping would in most cases be equally suitable, the wedge assembly providing a substantial mechanical advantage.

The structure is easily and rapidly assembled merely by inserting the tongues 40b and 42b into the passage 54 after which the wedge assembly 44 is inserted between the overlapping tongues, the shaft 62 thereafter being tightened by a single turning action to secure the support brackets 40 and 42 on the conveyor support in the desired lateral position. As in the prior art construction of FIG. 1, the guide rails 24' are secured on the upstanding legs 40a and 42a at the desired height by means of the screws 29' inserted through elongated slots 26d' and secured by nuts 28'.

As best shown in FIG. 3 the upstanding support legs 40a are offset inwardly from the connecting portions 40c by the inward bend 40d so that the guide rails 24' may be positioned inwardly at a width smaller than the width of the conveyor support to accommodate articles of smaller size.

The guide rails may be adjusted laterally with an ease and quickness heretofore unattainable, merely by slightly loosening the shaft 62, adjusting the brackets 40 and 42, and then tightening the shaft 62 with a single turn. Moreover, this can be accomplished for most conveyor widths, by a single worker located at one side of the conveyor. As a result, the conveyor may be placed substantially against a wall or adjacent another conveyor or other piece of equipment with only enough clearance to accommodate the maximum outward adjustment of the bracket at that side of the conveyor.

By locking the tongues 40b and 42b in overlapping relationship a total lateral adjustment for each bracket equal to almost the entire width of the conveyor is afforded. For very wide conveyors, however, it may be more practical and economical to provide two identical brackets like the righthand bracket 42 in FIG. 3 both adapted to be locked to the top of the tubular member 46 by either a single long wedge assembly or two smaller assemblies on either side of the conveyor frame engaging the two tongues, respectively.

The most important advantage of my new bracket assembly, however, resides in the complete elimination of all laterally protruding parts. In this regard, the outwardly extending end of adjusting 62 is preferably maintained inboard of the connecting portion 42c of bracket 42 so that the structure presents a smooth, compact and clean appearance with no projecting parts whatsoever to pose a safety hazard.

Finally, it will be apparent that my new bracket structure in addition to providing an improved design, requires fewer parts and less material while at the same time increasing the strength and structural integrity of both the bracket supports and the conveyor frame. For example, the tubular connecting member of my new design is substantially stronger than the conventional angle brackets used in the prior art structure. While this new connecting structure requires more material, that increase in material cost is more than compensated for by the complete elimination of one pair of angle brackets for the guide rail support structure. And it will be noted that the single pair of brackets in the improved structure here described have their supporting tongues sandwiched between two members and are thus anchored directly to the conveyor frame, thereby to provide substantially increased resistance to bending moments. As a result of the increased strength of both the brackets and the conveyor support, the tubes and brackets may be spaced at larger distances along the conveyor side frames thereby to effect a further savings in material cost.

While only a single embodiment of the present invention has been specifically disclosed herein, it will be apparent that many variations may be made therein, all within the scope of the invention, as defined in the following claims.

I claim:

1. In a conveyor apparatus for conveying articles having a movable conveyor means, a conveyor support adapted to mount said movable conveyor means and a pair of guide rails for maintaining the conveyed articles properly positioned on the movable conveying means, means for mounting said guide rails for lateral adjustment perpendicular to the direction of movement of said conveyor means comprising a pair of guide rail mounting members each having a base portion extending generally laterally substantially parallel to one another, a generally vertically extending upstanding portion adapted to mount said guide rail and a connecting portion operatively connecting said upstanding portion to said base portion, said conveyor support being provided with recesses below said conveyor means and at opposite sides thereof, said recesses being adapted to receive the substantially parallel base portions of said guide rail mounting members respectively, said base portions being movable in a generally lateral direction into and out of said recesses between inner and outer positions, said connecting portions in the inner position of said guide rail mounting member extending upwardly above said conveyor means and inwardly thereover, thereby to position said upstanding portions inwardly of the outer edges of said conveyor means, and adjustable locking means to lock said base portions of said guide rail mounting members to said conveyor support in any position between said inner and outer positions.

2. The apparatus of claim 1, wherein said conveyor support comprises a pair of spaced side walls, means structurally connecting said side walls at spaced intervals along the length of said conveyor support, said recesses comprising openings in said side walls adjacent said structural connecting means, said adjustable locking means being effective to lock said base portions of said guide rail mounting members to said structural connecting means.

3. In a conveyor apparatus for conveying articles having a movable conveyor means, a conveyor support adapted to mount said movable conveyor means and a pair of guide rails for maintaining the conveyed articles properly positioned on the movable conveying means, means for mounting said guide rails for lateral adjustment perpendicular to the direction of movement of said conveyor means comprising a pair of guide rail mounting members each having a laterally extending base portion, an upstanding portion adapted to mount said guide rail and a connecting portion operatively connecting said upstanding portion to said base portion, said conveyor support being provided with recesses below said conveyor means and at opposite sides thereof, said recesses being adapted to receive the base portions of said guide rail mounting members, said base portions being movable in a direction into and out of said recesses between inner and outer position, said connecting portions in the inner position of said guide rail mounting member extending upwardly above said conveyor means and inwardly thereover, thereby to position said upstanding portions inwardly of the outer edges of said conveyor means, and adjustable locking means to lock said base portions of said guide rail mounting members to said conveyor support in any position between said inner and outer positions, wherein said conveyor support comprises a pair of spaced side walls, means structurally connecting said side walls at spaced intervals along the length of said conveyor support, said recesses comprising openings in said side walls adjacent said structural connecting means, said adjustable locking means being effective to lock said base portions of said guide rail mounting members to said structural connecting means, wherein said recesses comprise openings in said side walls and said structural connecting means comprises a hollow tubular member open at both ends and registering with said openings, said locking means being adapted to force said base portions of said guide rail mounting members into frictional locking engagement with said tubular member.

4. The apparatus of claim 3, wherein said base portions are received within said hollow tubular member in overlapping relationship, said locking means being effective to force said base portions into frictional locking engagement with opposing walls of said tubular member.

5. The apparatus of claim 3, wherein said locking means comprises expandable means received within said tubular member and manually adjustable means operatively connected to said expandable means, accessible through at least one of said openings and effective upon adjustment thereof to cause said expandable means to expand toward said opposing walls of said tubular member.

6. The apparatus of claim 5, wherein said base portions are received within said hollow tubular member in overlapping relationship, said locking means being effective to force said base portions into frictional locking engagement with opposing walls of said tubular member.

7. The apparatus of claim 5, wherein said locking means comprises an expandable wedge assembly, said expandable means comprising a pair of oppositely facing wedge blocks having interfitting inclined surfaces and said adjustable means comprising means to adjustably draw said wedge blocks toward each other.

8. In a conveyor apparatus for conveying articles having a movable conveyor means, a conveyor support adapted to mount said movable conveyor means and a pair of guide rails for maintaining the conveyed articles properly positioned on the movable conveying means, means for mounting said guide rails for lateral adjustment perpendicular to the direction of movement of said conveyor means comprising a pair of guide rail mounting members each having a base portion extending generally laterally substantially parallel to one another, a generally vertically extending upstanding portion adapted to mount said guide rail with the article-engaging surface of said guide rail located inboard of said upstanding portion and a connecting portion operatively connecting said upstanding portion to said base portion, said conveyor support being provided with recesses below said conveyor means and at opposite sides thereof, said recesses being adapted to receive the substantially parallel base portions of said guide rail mounting members respectively, said base portions being movable in a generally lateral direction into and out of said recesses between inner and outer positions, said connecting portions in the inner position of said guide rail mounting member extending upwardly above said conveyor means, thereby to position said upstanding portions, and adjustable locking means to lock said base portions of said guide rail mounting members to said conveyor support in any position between said inner and outer positions.

9. The apparatus of claim 8, wherein said conveyor support comprises a pair of spaced side walls, means structurally connecting said side walls at spaced intervals along the length of said conveyor support, said recesses comprising openings in said side walls adjacent said structural connecting means, said adjustable locking means being effective to lock said base portions of said guide rail mounting members to said structural connecting means.

10. The apparatus of claim 9, wherein said recesses comprise openings in said side walls and said structural connecting means comprises a hollow tubular member open at both ends and registering with said openings, said locking means being adapted to force said base portions of said guide rail mounting members into frictional locking engagement with said tubular member.

11. The apparatus of claim 10, wherein said base portions are received within said hollow tubular member in overlapping relationship, said locking means being effective to force said base portions into frictional locking engagement with opposing walls of said tubular member.

12. The apparatus of claim 10, wherein said locking means comprises expandable means received within said tubular member and manually adjustable means operatively connected to said expandable means, accessible through at least one of said openings and effective upon adjustment thereof to cause said expandable means to expand toward said opposing walls of said tubular member.

13. The apparatus of claim 12, wherein said base portions are received within said hollow tubular member in overlapping relationship, said locking means being effective to force said base portions into frictional locking engagement with opposing walls of said tubular member.

14. The apparatus of claim 12, wherein said locking means comprises an expandable wedge assembly, said expandable means comprising a pair of oppositely facing wedge blocks having interfitting inclined surfaces and said adjustable means comprising means to adjustably draw said wedge blocks towards each other.

* * * * *